United States Patent
Huang

(10) Patent No.: US 8,275,426 B2
(45) Date of Patent: Sep. 25, 2012

(54) BUTTON CONTROL STRUCTURE FOR ELECTRONIC DEVICE

(75) Inventor: Lei Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 379 days.

(21) Appl. No.: 12/768,692

(22) Filed: Apr. 27, 2010

(65) Prior Publication Data

US 2011/0045878 A1 Feb. 24, 2011

(30) Foreign Application Priority Data

Aug. 18, 2009 (CN) .................. 2009 2 0308175 U

(51) Int. Cl.
*H04M 1/00* (2006.01)

(52) U.S. Cl. .................................. 455/575.3; 455/550.1
(58) Field of Classification Search ................ 455/550.1, 455/575.1, 575.3
See application file for complete search history.

(56) References Cited

U.S. PATENT DOCUMENTS

2006/0242795 A1* 11/2006 Duan et al. .................. 16/330
* cited by examiner Primary Examiner — Christian Hannon
(74) Attorney, Agent, or Firm — Altis Law Group, Inc.

(57) ABSTRACT

A button control structure is used for an electronic device including a barrel defining a groove. The button control structure includes a button, a support element and a split ring gasket. The support element defines a slot. The button is slidably attached to the support element. One portion of the split ring gasket is received in the slot, the other portion projected from the slot and received in the groove.

11 Claims, 5 Drawing Sheets

BUTTON CONTROL STRUCTURE FOR ELECTRONIC DEVICE

BACKGROUND

1. Technical Field

The present disclosure generally relates to control structures and, particularly, to a button control structure for use in an electronic device.

2. Description of Related Art

Foldable mobile phones generally include a cover and a body rotatably interconnected by a hinge assembly for switching the mobile phone between an in-use position and a closed position. A button is usually disposed on the foldable mobile phone to release the hinge assembly to automatically open the cover relative to the body. However, when installing the button, the hinge assembly may be damaged. In addition, the button control structure is not very strong and so can easily be damaged and may even fall apart should, for example, the foldable mobile phone be dropped.

Therefore, there is room for improvement within the art.

BRIEF DESCRIPTION OF THE DRAWINGS

Many aspects of the button control structure can be better understood with reference to the following drawings. The components in the drawings are not necessarily drawn to scale, the emphasis instead being placed upon clearly illustrating the principles of the button control structure. Moreover, in the drawings, like reference numerals designate corresponding parts throughout the several views, in which.

DETAILED DESCRIPTION

Figure 1:
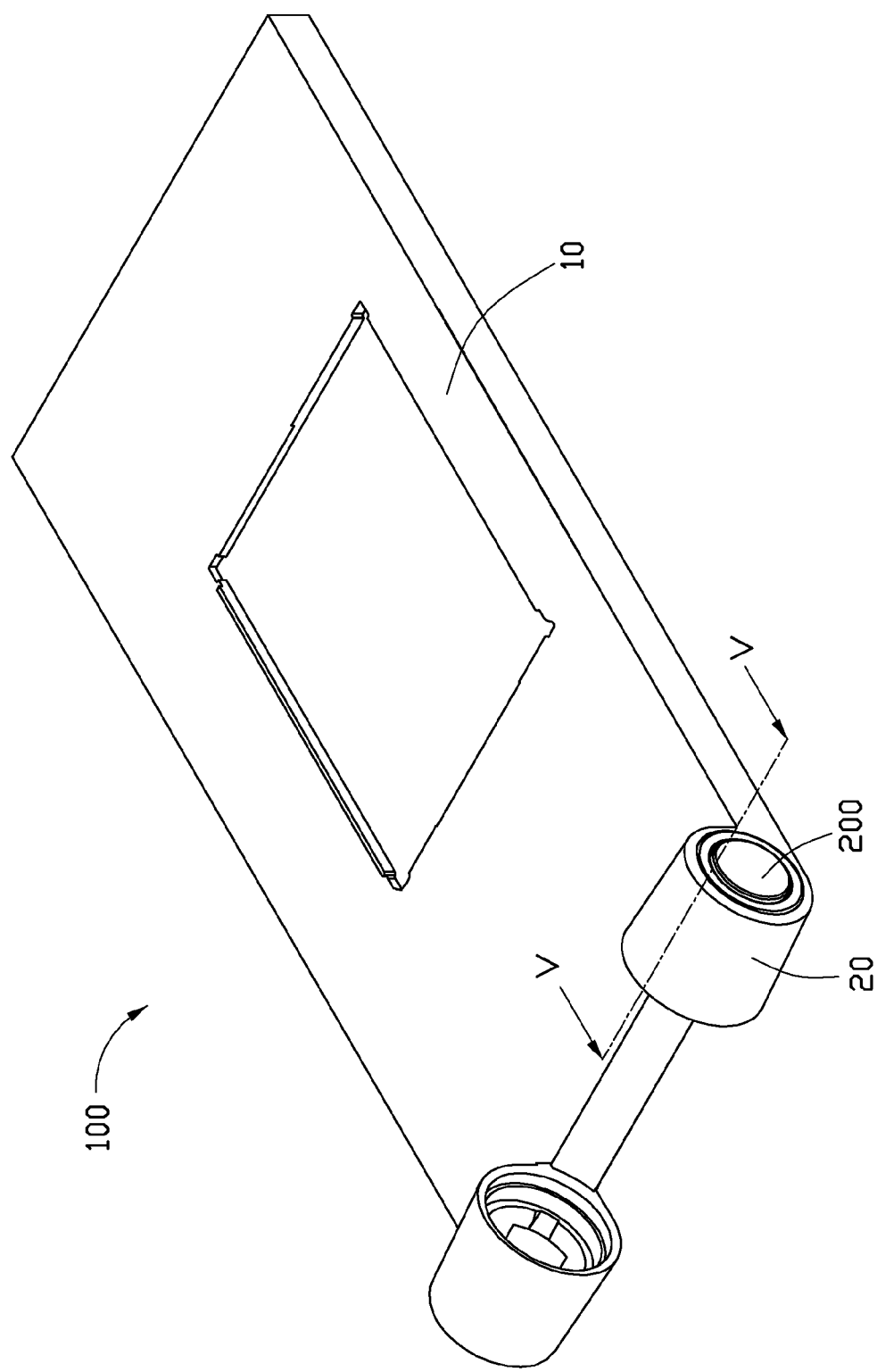
FIG. 1 is an isometric view of an electronic device using a button control structure in accordance with an exemplary embodiment.
Figure 2:
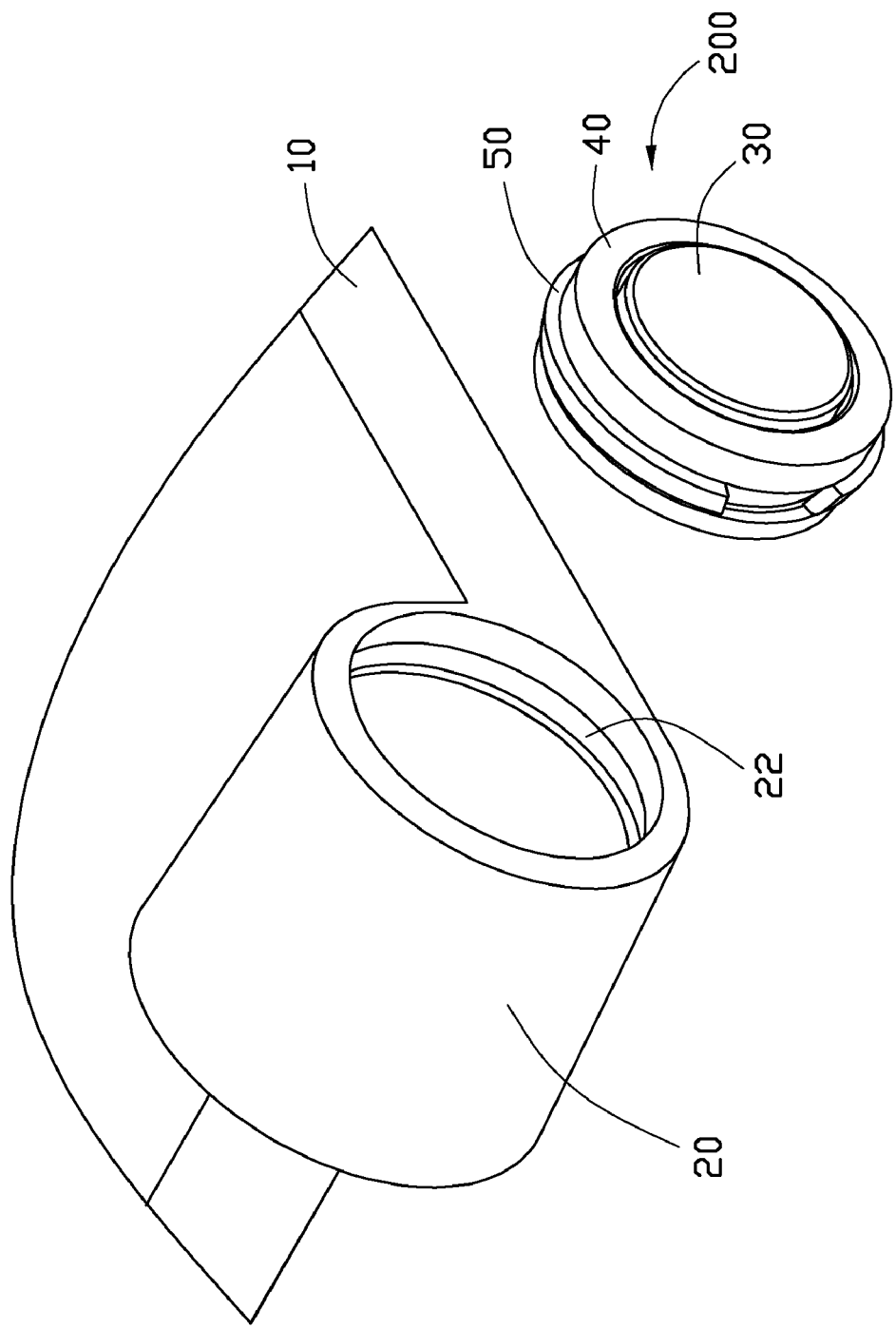
FIG. 2 is an exploded, isometric view of the button control structure and the electronic device.

FIGS. 1 and 2 show a button control structure 200 used in a mobile phone 100. The mobile phone 100 is an exemplary application, for the purposes of describing details of an exemplary embodiment of the button control structure 200. The mobile phone 100 includes a main body 10 hinged to a cover (not shown). The button control structure 200 incorporates a button 30, a support element 40, and a split ring gasket 50.

The main body 10 includes two opposite barrels 20 at opposite edges of one end thereof. The barrels 20 receive portions of a hinge assembly (not shown). In this embodiment, the hinge assembly usually includes a cam, a threaded shaft, a control and a spring. The cam is placed around the threaded shaft, and is locked by the control so that the cam cannot rotate relative to the threaded shaft. The cam is unlocked to drive open the cover when the control of the hinge assembly is activated by the button control structure 200. One of the barrels 20 defines a groove 22 in an inner peripheral wall thereof.

Figure 3:
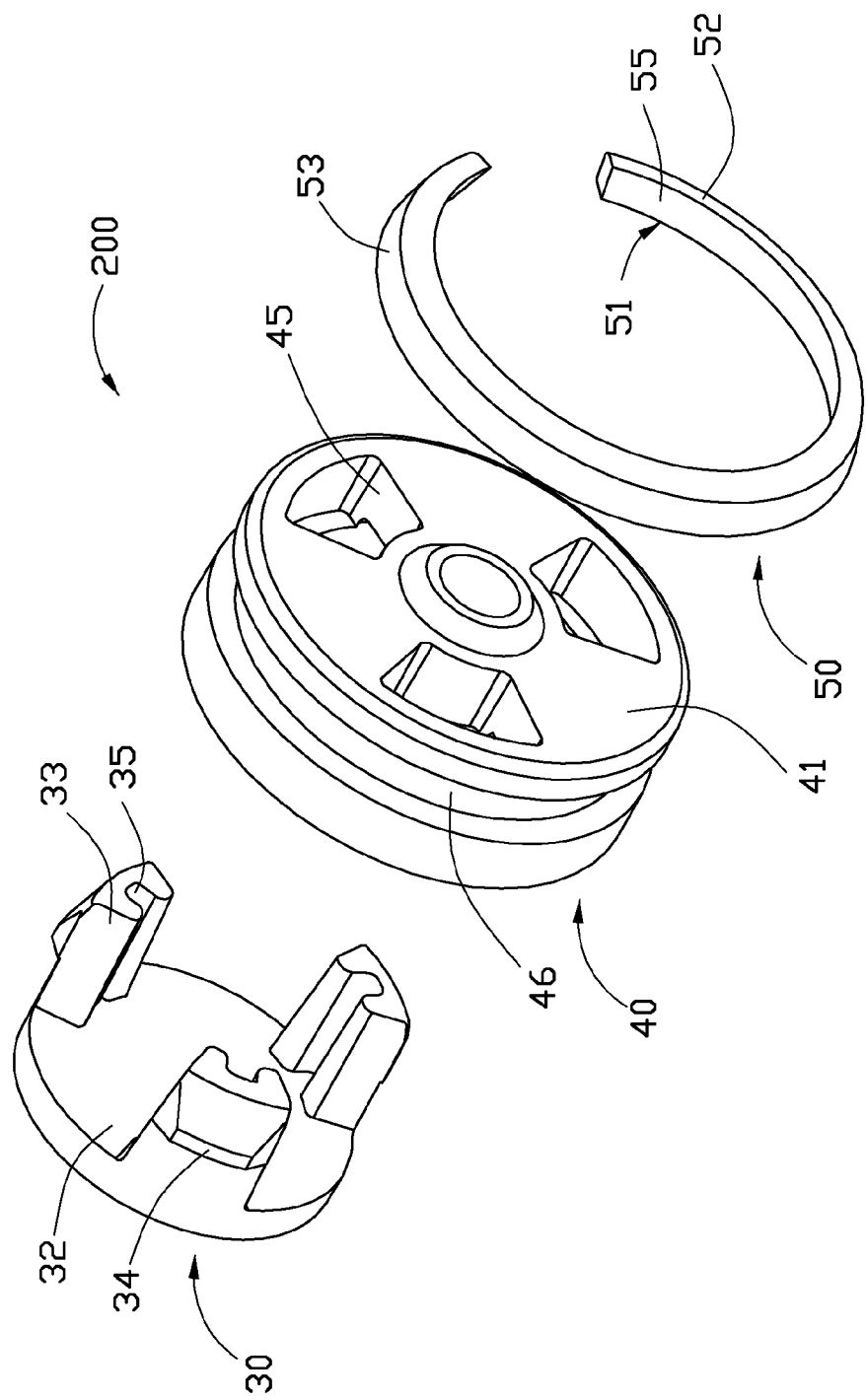
FIG. 3 is an exploded, isometric view of the button control structure.
Figure 4:
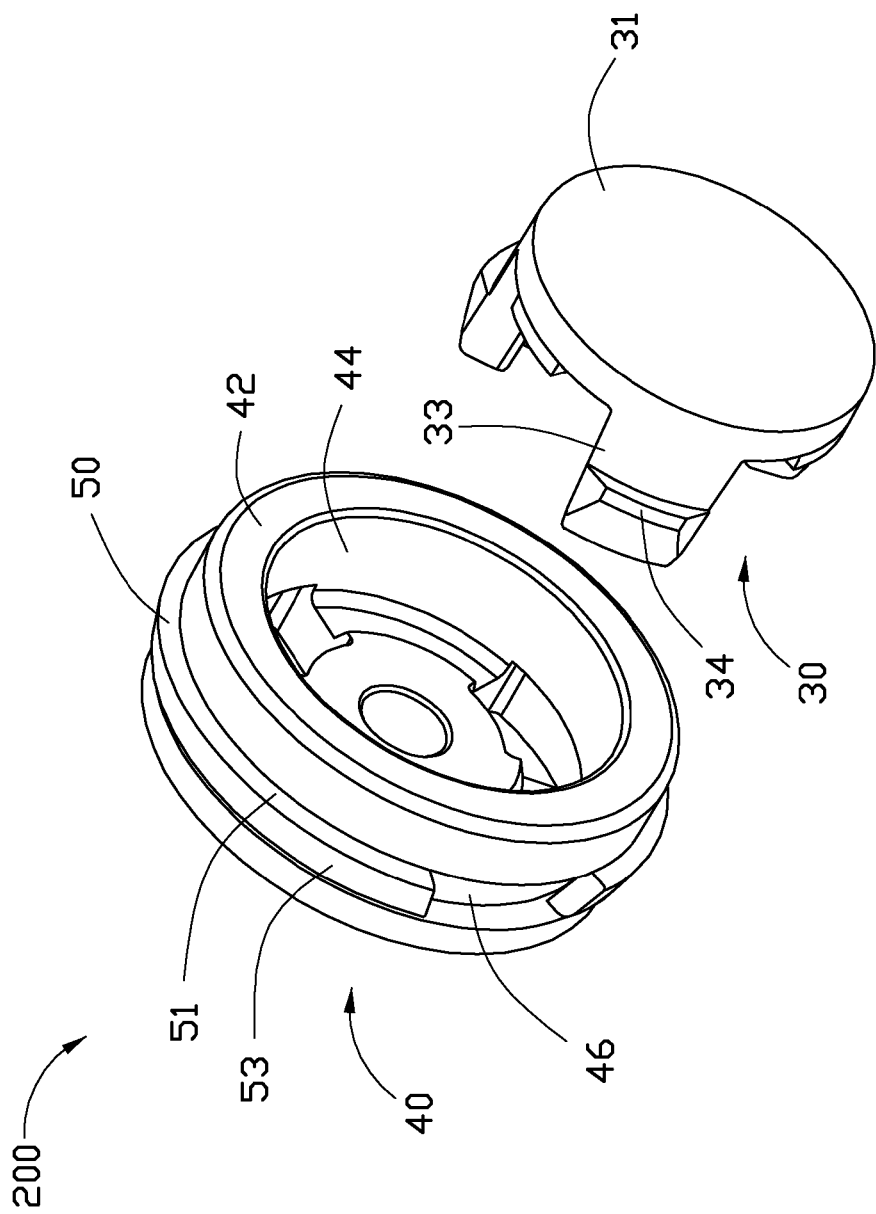
FIG. 4 is a partially assembled view of FIG. 3.

Referring to FIGS. 3 and 4, the button 30 includes a disk body 31 and a plurality of arms 33 extending from a periphery of the disk body 31. A protrusion 34 extends from an outward facing surface of each arm 33. Each arm 33 defines a notch 35 in an inward facing surface thereof for improving deformation ability of the arms 33.

The support element 40 is substantially cylindrical, and includes a base portion 41 and a sleeve portion 42 integrally formed together. The sleeve portion 42 defines a cavity 44 for receiving the button 30. The base portion 41 defines a plurality of openings 45 configured to receive the arms 33. A slot 46 is defined in an outer peripheral surface of the sleeve portion 42.

The split ring gasket 50 is made of flexible and elastic material such as rubber or soft plastics and has an adjustable radius due to the split configuration. The split ring gasket 50 includes a first side surface 51, a second side surface 52, an outer circumferential surface 53 and an inner circumferential surface 55. The first side surface 51 is wider than the second side surface 52. The outer circumferential surface 53 and the inner circumferential surface 55 are inclined relative to a central line of the split ring gasket 50.

Figure 5:
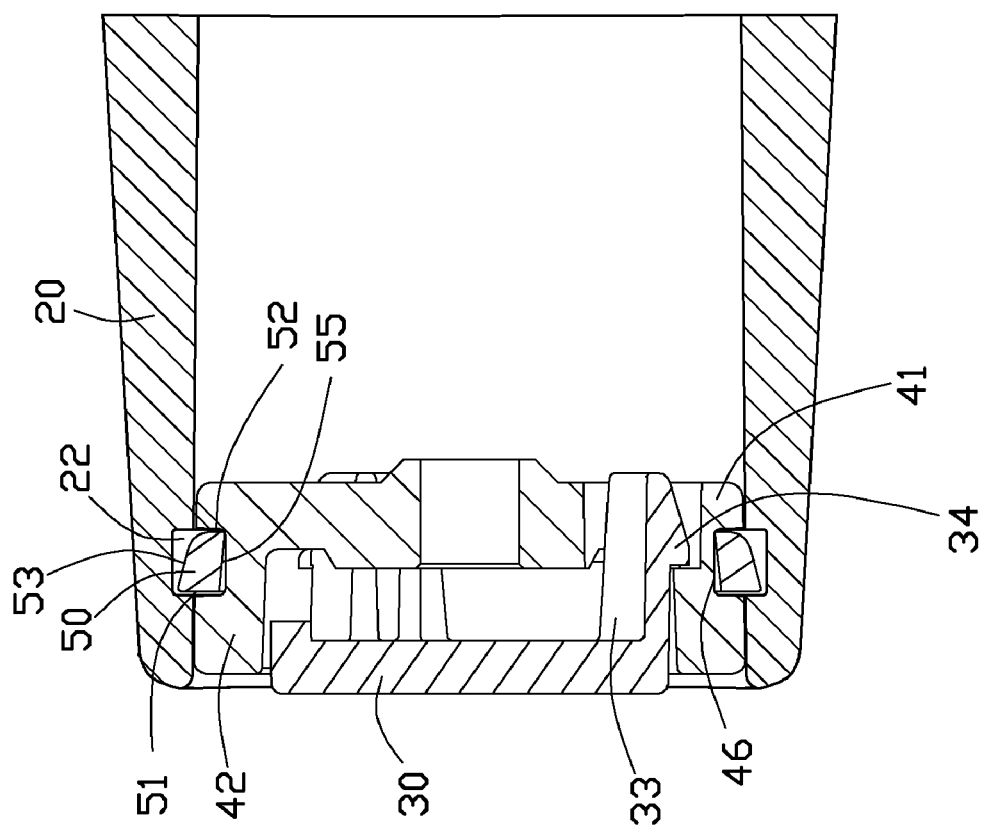
FIG. 5 is a cross sectional view of the button control structure of FIG. 1 along line V-V.

During assembly of the mobile phone 100, referring to FIG. 5, first, the button 30 is received in the cavity 44 of the support element 40. The arms 33 are pressed to extend through the openings 45. The protrusions 34 pass through the openings 45, and the arms 33 are released. The protrusions 34 are latched with the base portion 41. Then, the split ring gasket 50 is received in the slot 46. The first side surface 51 is far away from the disk body 41 of the support element 40. After that, the support element 40 with the button 30 and the split ring gasket 50 is assembled to the barrel 20. The outer peripheral wall of the sleeve portion 42 engages with the inner wall of the barrel 20. The split ring gasket 50 is forced to deform until the slot 46 is aligned with the groove 22. The split ring gasket 50 is latched in the slot 46 and the grove 22. Accordingly, the support element 40 is latched to the barrel 20. The button 30 is exposed from the barrel 20. Thus, the button control structure 200 is assembled in the mobile phone 100.

In use, the user may press the button 30, which causes the arms 33 to slide relative to the support element 40. When the arms 33 are pressed, they contact the cam (not shown) and cause it to unlock. The cam will rotate relative to the threaded shaft (not shown) and cause the cover to be opened by the spring (not shown). The split ring gasket 50 may prevent the support element 40 separating from the barrel 20. In addition, the assembly process of the button control structure is simple.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A button control structure for an electronic device including a barrel defining a groove, the button control structure comprising:
    a button;
    a support element being substantially cylindrical, and including a base portion and a hollow sleeve portion integrally formed together, an inner periphery of the sleeve portion and the base portion defining a cavity for receiving the button, an outer periphery of the sleeve portion defining a slot facing the groove, the button slidably attached to the support element; and
    a split ring gasket, one portion of the split ring gasket being received in the slot, the other portion projected from the slot and received in the groove.

2. The button control structure as claimed in claim 1, wherein the button includes a disk body and a plurality of arms extending from a periphery of the disk body, the disk body and the arms are received in the cavity, and the base portion defines a plurality of openings receiving the arms.

3. The button control structure as claimed in claim 2, wherein a protrusion extends from an outward facing surface of each arm for engaging with the base portion of the support element.

4. The button control structure as claimed in claim 3, wherein each arm defines a notch in an inward facing surface thereof.

5. The button control structure as claimed in claim 1, wherein the split ring gasket is made of flexible and elastic material.

6. The button control structure as claimed in claim 1, wherein the split ring gasket includes a first side surface, a second side surface, an outer circumferential surface and an inner circumferential surface, the first side surface is wider than the second side surface, the outer circumferential surface and the inner circumferential surface are inclined relative to a central line of the split ring gasket.

7. An electronic device comprising:
a main body forming a barrel defining a groove;
a button;
a support element defining a slot, the button slidably attached to the support element; and
a split ring gasket including a first side surface, a second side surface, an outer circumferential surface and an inner circumferential surface, the first side surface being wider than the second side surface, the outer circumferential surface and the inner circumferential surface being inclined relative to a central line of the split ring gasket, the split ring gasket being received in the slot and the groove for preventing the support element to separate from the main body.

8. The electronic device as claimed in claim 7, wherein the support element is substantially cylindrical, and includes a base portion and a sleeve portion integrally formed together, and the sleeve portion defines a cavity for receiving the button.

9. The electronic device as claimed in claim 8, wherein the button includes a disk body and a plurality of arms extending from a periphery of the disk body, and the base portion defines a plurality of openings receiving the arms.

10. The electronic device as claimed in claim 9, wherein each arm includes a protrusion engaging with the base portion of the support element.

11. A button control structure for an electronic device including a barrel defining a groove, the button control structure comprising:
a button;
a support element defining a slot, the button slidably attached to the support element; and
a split ring gasket including a first side surface, a second side surface, an outer circumferential surface and an inner circumferential surface, the first side surface being wider than the second side surface, the outer circumferential surface and the inner circumferential surface being inclined relative to a central line of the split ring gasket, one portion of the split ring gasket being received in the slot, the other portion projected from the slot and received in the groove.

* * * * *